United States Patent
Aust et al.

(10) Patent No.: US 10,017,107 B2
(45) Date of Patent: *Jul. 10, 2018

(54) LIGHT ACTIVATION SEQUENCE OF A VEHICLE

(71) Applicant: Ford Global Technologies, LLC, Dearborn, MI (US)

(72) Inventors: Frank Aust, Neuss (DE); Terrence Joseph Wilson, Southfield, MI (US); Stephen Kenneth Helwig, Farmington Hills, MI (US); David A. Brown, Plymouth, MI (US); Max Anton Schumacher, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 64 days.

This patent is subject to a terminal disclaimer.

(21) Appl. No.: 15/351,883

(22) Filed: Nov. 15, 2016

(65) Prior Publication Data

US 2018/0134211 A1    May 17, 2018

(51) Int. Cl.
*B60Q 1/30* (2006.01)
*B60Q 1/50* (2006.01)
(Continued)

(52) U.S. Cl.
CPC .............. *B60Q 1/50* (2013.01); *B60Q 1/0023* (2013.01); *B60Q 1/04* (2013.01); *B60Q 1/14* (2013.01); *B60Q 1/30* (2013.01); *H05B 33/0845* (2013.01); *H05B 37/029* (2013.01); *H05B 37/0272* (2013.01); *B60Q 2300/054* (2013.01);
(Continued)

(58) Field of Classification Search
CPC .......... B60Q 1/50; B60Q 1/0023; B60Q 1/04; B60Q 1/14; B60Q 2300/054; B60Q 300/14; B60Q 400/30; B60Q 400/40; B60Q 2900/30; H05B 33/0845; H05B 37/0272; H05B 37/029
See application file for complete search history.

(56) References Cited

U.S. PATENT DOCUMENTS 7,825,600 B2    11/2010   Stam et al.
8,108,141 B2 *   1/2012   Ehrlacher .......... G01C 21/3461
                                                         701/416
(Continued)

FOREIGN PATENT DOCUMENTS

DE    102011118675 A1    5/2013
KR    2014-0088626 A *   7/2014  ............... B60Q 1/50

OTHER PUBLICATIONS

Wieher et al., DriveSense: Contextual handling of large-scale route map data for the automobile, 2013, IEEE, p. 87-94 (Year: 2013).*

(Continued)

*Primary Examiner* — McDieunel Marc
(74) *Attorney, Agent, or Firm* — Jason Rogers; Price Heneveld LLP

(57) ABSTRACT

A lighting system of a vehicle is provided herein and includes a headlamp, a taillight, and a controller configured to operate the headlamp and the taillight. The controller implements an activation sequence based on a state of a door. The activation sequence includes sequentially activating at least one of the headlamp and the taillight from inboard to outboard.

20 Claims, 5 Drawing Sheets

(51) Int. Cl.
  *B60Q 1/04* (2006.01)
  *B60Q 1/00* (2006.01)
  *B60Q 1/14* (2006.01)
  *H05B 37/02* (2006.01)
  *H05B 33/08* (2006.01)

(52) U.S. Cl.
  CPC ...... *B60Q 2300/14* (2013.01); *B60Q 2400/30* (2013.01); *B60Q 2400/40* (2013.01); *B60Q 2900/30* (2013.01)

(56) References Cited

U.S. PATENT DOCUMENTS

| | | | | |
|---|---|---|---|---|
| 8,219,316 B2* | 7/2012 | Goel | ................. | G01C 21/3476 701/422 |
| 8,992,057 B2 | 3/2015 | Foley et al. | | |
| 9,157,760 B2* | 10/2015 | Aoki | ................. | G01C 21/3691 |
| 9,389,094 B2* | 7/2016 | Brenner | ............. | G01C 21/3676 |
| 9,631,939 B2* | 4/2017 | Brenner | ............. | G01C 21/3676 |
| 9,802,531 B2* | 10/2017 | Salter | ........................ | B60Q 3/30 |
| 9,846,052 B2* | 12/2017 | Lynn | ................... | G01C 21/3667 |
| 2009/0051522 A1 | 2/2009 | Perkins | | |

OTHER PUBLICATIONS

Guzolek et al., Real-time route planning in road networks, 1989, IEEE, p. 165-169 (Year: 1989).*
Wootton et al., The experience of developing and providing driver route information systems, 1989, IEEE, p. 71-75 (Year: 1989).*
Yatsuyanagi et al., Design of a return route support system using multiple mobile agents, 2014, IEEE, p. 1571-1576 (Year: 2014).*
ijdmtoy.com, "White/Amber Switchback LED Strip Lighting for Headlight Retrofit w/ Sequential Turn Signal Feature," web page, 2016, 3 pages, http://store.ijdmtoy.com/SwitchbackLEDStripForHeadlightRetrofitp/50035.htm.

* cited by examiner

LIGHT ACTIVATION SEQUENCE OF A VEHICLE

FIELD OF THE INVENTION

The present invention generally relates to lighting systems of a vehicle, and more particularly, to light activation sequences during a vehicle welcome event.

BACKGROUND OF THE INVENTION

Welcome lighting generally provides a sense of welcome and security as a driver approaches his or her vehicle. Existing welcome lighting may include exterior and/or interior lights that activate and remain activated for a specified time period. However, a downside to existing welcome lighting is that the visual effect is rather bland and predictable. Accordingly, there is a need for welcome lighting that produces a more dynamic visual effect.

SUMMARY OF THE INVENTION

According to one aspect of the present invention, a lighting system of a vehicle is provided. The lighting system includes a headlamp, a taillight, and a controller configured to operate the headlamp and the taillight. The controller implements an activation sequence based on a state of a door. The activation sequence includes fading in the headlamp and the taillight and maintaining the headlamp and the taillight at a predetermined intensity.

According to another aspect of the present invention, a lighting system of a vehicle is provided. The lighting system includes a headlamp, a taillight, and a controller configured to operate the headlamp and the taillight. The controller implements an activation sequence based on a state of a door. The activation sequence includes sequentially activating at least one of the headlamp and the taillight from inboard to outboard.

According to yet another aspect of the present invention, a lighting method of a vehicle is provided. The method includes the steps of: sensing a state of a door; based on the state of the door, sequentially activating at least one of a headlamp and a taillight; maintaining the headlamp and the taillight at a predetermined intensity; and sequentially deactivating at least one of the headlamp and the taillight from outboard to inboard upon expiration of a predetermined period of time.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
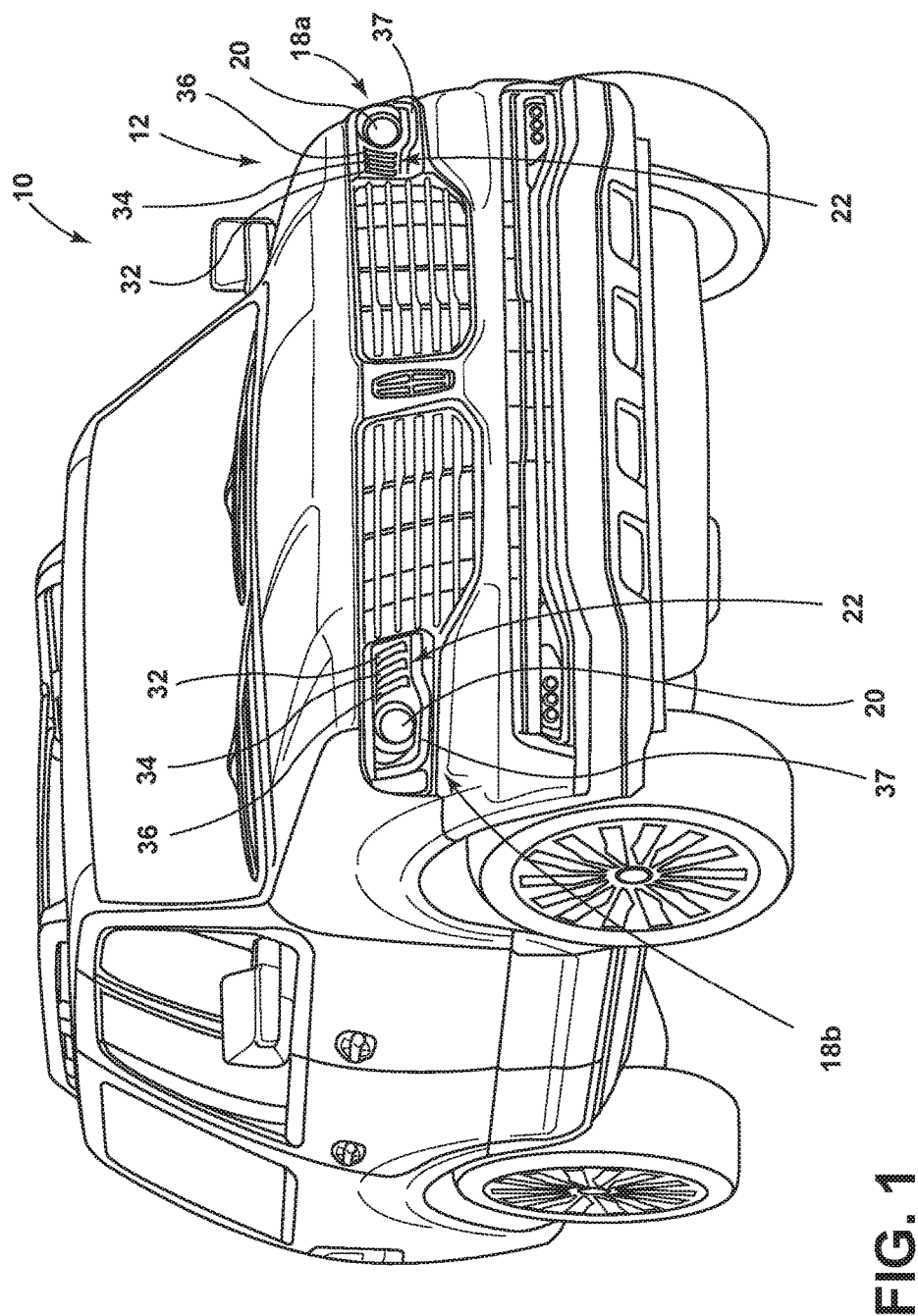
FIG. 1 is a front perspective view of a vehicle equipped with a lighting system.
Figure 2:
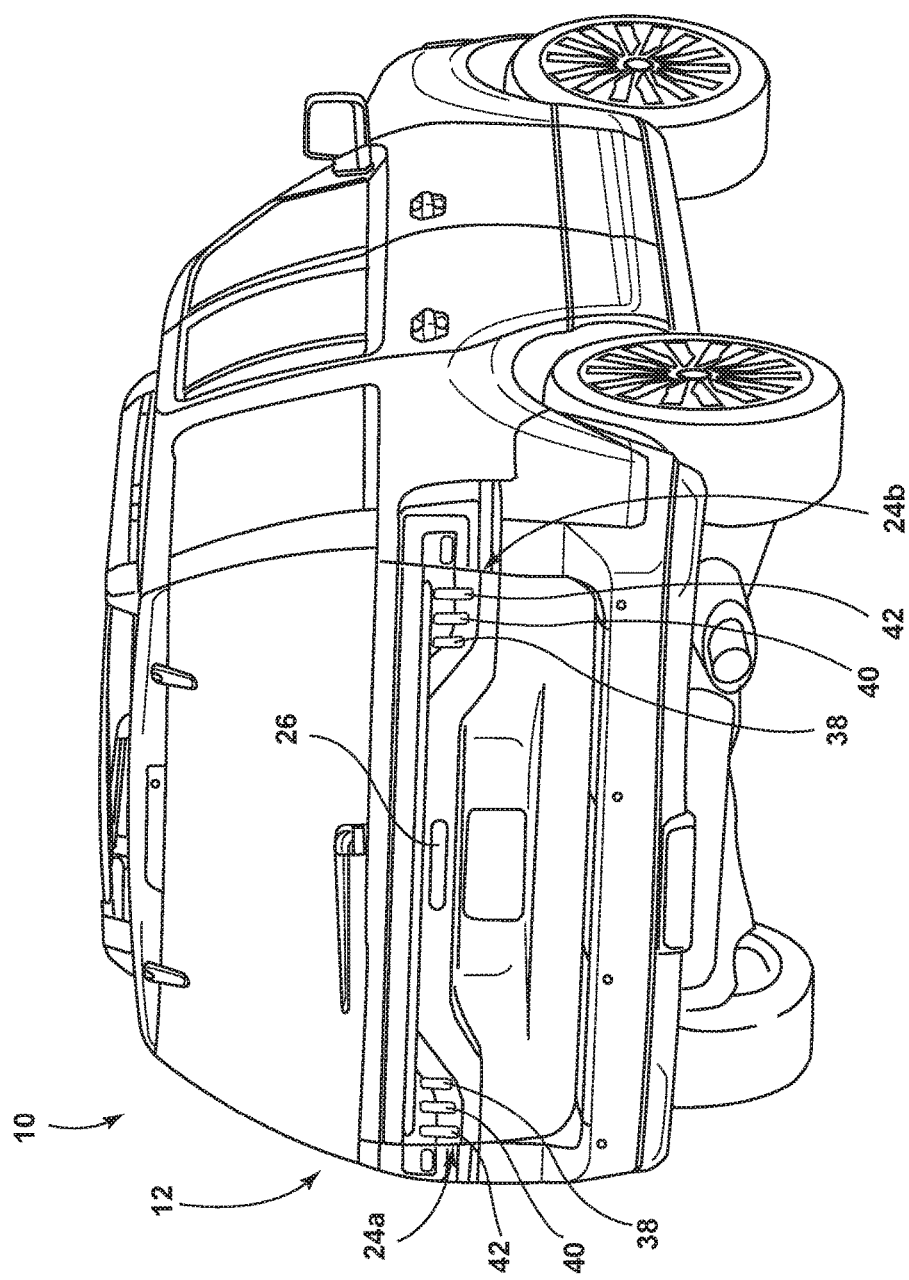
FIG. 2 is a rear perspective view of the vehicle.
Figure 3:
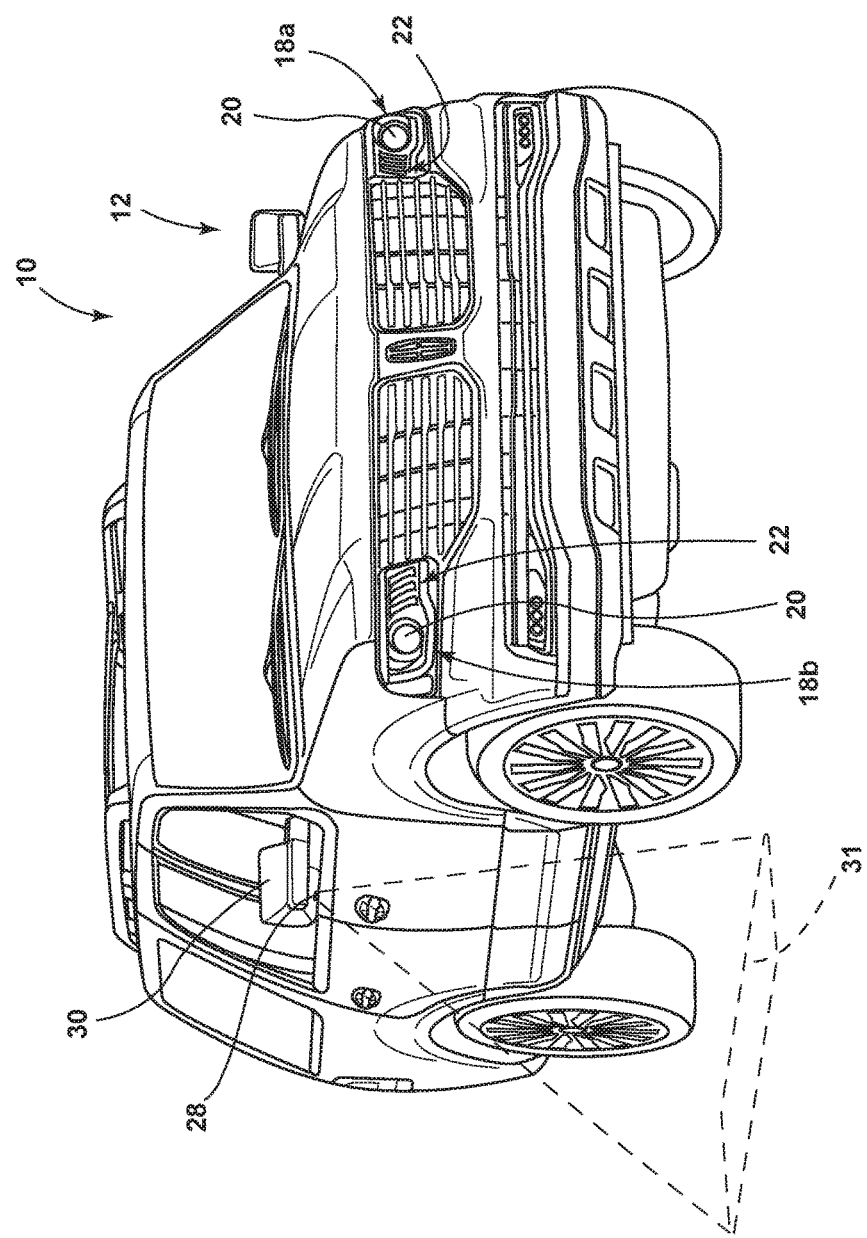
FIG. 3 is a front perspective view of the vehicle showing an activated puddle lamp.

Referring to FIGS. 1-3, a vehicle 10 is shown according to one embodiment. The vehicle 10, exemplarily shown as a sports utility vehicle, features a lighting system 12 including front exterior lights shown as a front left and front right headlamp 18*a*, 18*b*, each having a headlight 20 and a daytime running light (DRL) 22. While the headlight 20 and DRL 22 are shown as separate lighting elements, it is to be understood that a single lighting element may be used in the alternative. The lighting system 12 also includes rear exterior lights, which may include a rear left and rear right taillight 24*a*, 24*b*, both of which may be configured as a rear combination light (RCL). The rear exterior lights may further include a deck lid light 26, and/or other rear lights such as a center high mount stop light (not shown). Additionally, the lighting system 12 may include a puddle lamp 28 located at both sides of the vehicle 10 and exemplarily shown coupled to a side mirror assembly 30. As shown (FIG. 3), the puddle lamp 28 may project light substantially downward to illuminate a ground area 31 proximate the side of the vehicle 10.

According to one embodiment, the DRL 22 of the headlamps 18*a*, 18*b* is configured as a sequential light having illuminable elements 32, 34, and 36. As depicted, illuminable element 32 is located furthest inboard whereas illuminable element 36 is located furthest outboard with respect to the center longitudinal axis of the vehicle 10. In operation, the illuminable elements 32-36 may be independently illuminated to perform a variety of light functions. For example, the illuminable elements 32-36 may be illuminated in concert. Alternatively, the illuminable elements 32-36 may be sequentially activated from inboard to outboard. Said differently, illuminable element 32 may illuminate first, followed in turn by illuminable elements 34 and 36. Alternatively still, the illuminable elements 32-36 may be sequentially activated from outboard to inboard such that illuminable element 36 is first to illuminate, followed in turn by illuminable elements 34 and 32. Similarly, the illuminable element 32-36 may be sequentially deactivated from outboard to inboard or vice versa. While the illuminable elements 32-36 are shown as separate distinct structures, it is conceived that a structure generally having a unitary appearance may be configured to sequentially activate/deactivate in the manners described above. For example, structure 37 may correspond to a DRL and may be configured to gradually illuminate and gradually shutoff from inboard to outboard or vice versa.

Additionally or alternatively, it is conceived that the light intensity of the illuminable elements 32-36 may be altered, if desired. For example, the illuminable elements 32-36 may be faded in or out. In other words, the light intensity of the illuminable elements 32-36 may be gradually increased during an activation sequence or gradually decreased during a shut-off sequence. Alternatively, the illuminable elements 32-36 may be illuminated at a substantially constant light intensity. In addition to operating as a daytime running light, the DRL 22 may also function as a turn signal. For example, the DRL 22 may produce a visual lighting effect of outward motion in the direction of the intended turn as a result of the illuminable elements 32-36 being sequentially activated from inboard to outboard.

Similarly, the taillights 24a, 24b may each be configured as a sequential light having illuminable elements 38, 40, and 42. As depicted, illuminable element 38 is located furthest inboard whereas illuminable element 42 is located furthest outboard with respect to the center longitudinal axis of the vehicle 10. In operation, illuminable elements 38, 40, and 42 may operate in a similar fashion to the illuminable elements 32-36 of the DRL 22. That is, illuminable elements 38-42 may be illuminated in concert, sequentially activated/deactivated from inboard to outboard or vice versa. In each of these scenarios, the light intensity may be substantially constant or gradually increasing/decreasing. In operation, the taillights 24a, 24b may function as a daytime running light, a stop light, and a turn signal. It is to be understood that the taillights 24a, 24b may alternatively include other lighting elements for implementing the foregoing functions.

Figure 4:
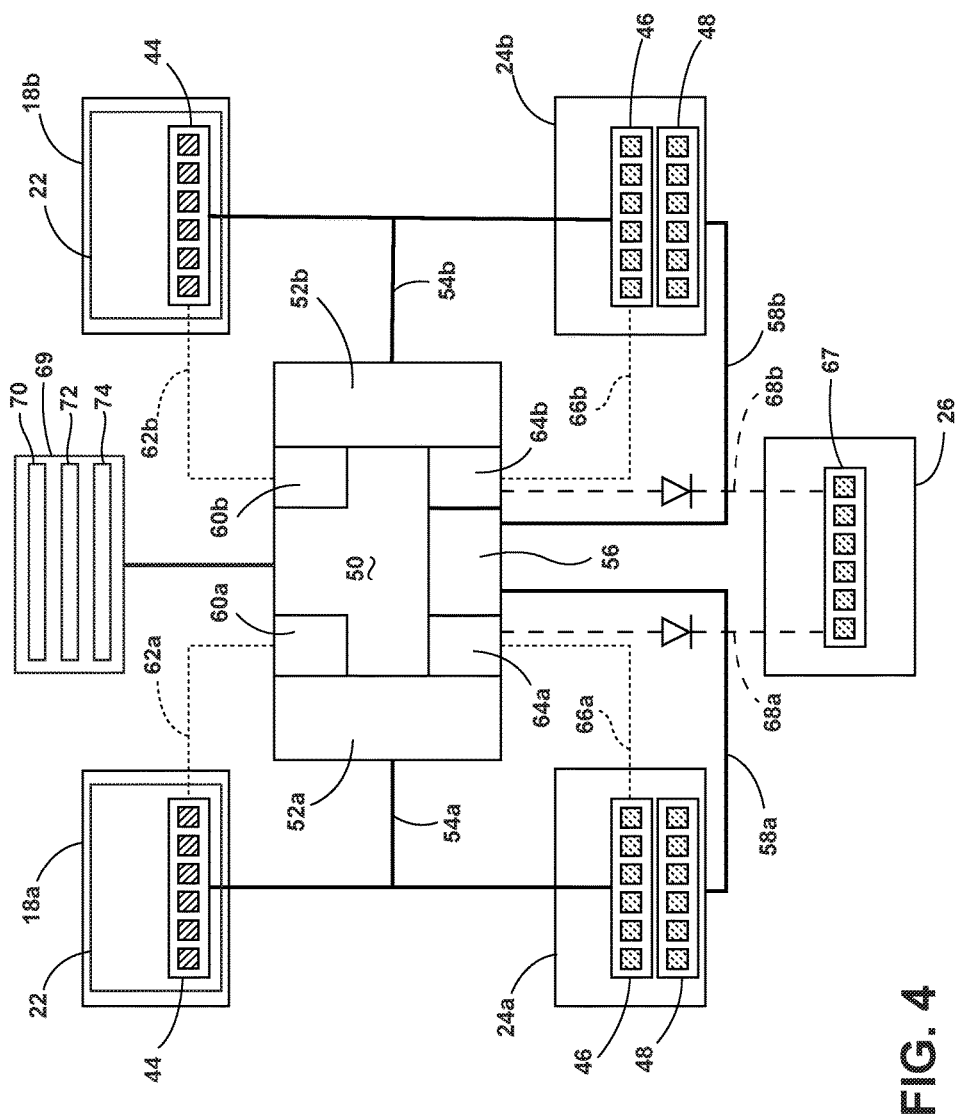
FIG. 4 is a block diagram of the lighting system.

Referring to FIG. 4, the DRL 22 of the front left and front right headlamps 18a, 18b includes a light source, shown as light-emitting diode (LED) array 44, for producing daytime running light. While the LED array 44 is shown with 6 LEDs, it should be understood that more or less LEDs may be employed if desired. Furthermore, it is to be understood that the LED array 44 may also be used for producing light for the corresponding headlight 20. Alternatively, each headlight 20 may have its own dedicated LED array or other light source. In the depicted embodiment, the rear left and rear right taillights 24a, 24b each include a first LED array 46 for producing daytime running light and a second LED array 48 for producing brake and/or turn signal light. For purposes of illustration, the first and second LED arrays 46, 48 are exemplarily shown having six LEDs. However, more or less LEDs may be used if desired.

With continued reference to FIG. 4, the lighting system 12 further includes a controller 50 operably coupled to LED arrays 44, 46, and 48. In the depicted embodiment, the controller 50 may be configured as a microcontroller of the body control module (BCM) of the vehicle 10 and is coupled to a power source (not shown) of the vehicle 10. The controller 50 includes two separate channels 52a, 52b, one for independently controlling LED array 44 and 46 of the front left headlamp 18a and the rear left taillight 24a, respectively, and the other for independently controlling LED array 44 and 46 of the front right headlamp 18b and the rear right taillight 24b, respectively. As shown, channels 52a and 52b are electrically coupled to corresponding LED arrays 44 and 46 via power lines 54a and 54b, respectively. The controller 50 also includes a dual-channel 56 for independently controlling LED array 48 of the rear left taillight 24a and the rear right taillight 24b, and is electrically coupled to the LED arrays 48 via power lines 58a and 58b, respectively.

In the depicted embodiment, the controller 50 includes channels 60a and 60b that are electrically coupled to the LED array 44 of the front left and front right headlamps 18, 18b via respective signal lines 62a and 62b. The controller 50 also includes channels 64a and 64b that are electrically coupled to the LED array 46 of the rear left and rear right taillights 24a, 24b via respective signal lines 66a and 66b. In operation, the controller 50 generates pulse-width modulation (PWM) signals over the signal lines 62a, 62b, 66a, 66b to control the visual lighting effect produced by the corresponding LED arrays 44, 46. For example, the PWM signals may cause the LED arrays 44, 46 to fade in, fade out, sequentially activate, sequentially deactivate, or a combination thereof. In some embodiments, channels 64a and 64b may be electrically coupled to an LED array 67 of the deck lid light 26 via respective power lines 68a and 68b. For purposes of illustration, the LED array 67 is shown having six LEDs. However, the number of LEDs may vary in other embodiments.

In operation, the controller 50 may generate PWM signals of varying duty cycles for controlling the light assemblies described herein (e.g., headlamps 18a and 18b, and taillights 24a and 24b). For example, at approximately 0-10% duty cycle, the corresponding light assembly is generally operated at an OFF state. At approximately 10-15%, the corresponding light assembly is generally operated as a parking light. At approximately 20-85% duty cycle, the corresponding light assembly is generally operated as a sequential light. The relationship between the duty cycle and sequential activation may be linear, for example 1-100% with a step size of less than 1%. At approximately 10-95% duty cycle corresponding light assembly may be faded in or out at a luminous output ranging from 1-100% with a step size of less than 1%. At 100% duty cycle, the corresponding light assembly may be maintained at 100% luminous output.

With respect to the embodiments described herein, the controller 50 may be communicatively coupled with vehicle related equipment 69 such as a door sensor 70 and a wireless electronic device such as a key fob 72 and/or a smart device 74 such as a smartphone. It is conceived that the controller 50 may operate the headlamps 18a, 18b and the taillights 24a, 24b based on signals received from the vehicle related equipment 69, as will be described in greater detail below.

Figure 5:
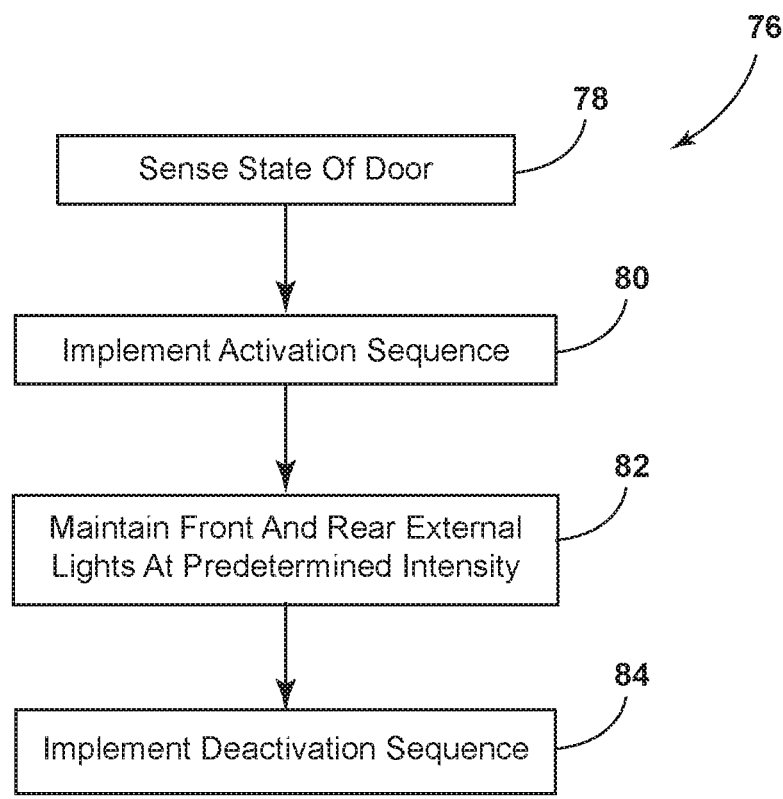
FIG. 5 is a lighting method implemented by the lighting system shown in FIGS. 1-4.

Referring to FIG. 5, a flow diagram of a lighting method 76 is shown according to one embodiment and may be implemented by the lighting system 12 described herein with reference to FIGS. 1-4. At step 78, the controller 50 of the lighting system 12 senses a state of a door of the vehicle 10. Based on the state of the door, the controller 50 implements an activation sequence at step 80. In one embodiment, the controller 50 fades in the DRL 22 of the headlamps 18a, 18b and also fades in the taillights 24a, 24b based on the door being unlocked using key fob 72 or smart device 74 and/or the key fob 72 or smart device 74 being detected in proximity to the vehicle 10. Alternatively, the controller 50 may sequentially activate the DRL 22 of the headlamps 18a, 18b while fading in the taillights 24a, 24b. Alternatively still, the controller 50 may sequentially activate the DRL 22 of headlamps and also sequentially activate the taillights 24a, 24b. According to one embodiment, the controller 50 sequentially activates the DRL 22 of the headlamps 18a, 18b and/or the taillights 24a, 24b from inboard to outboard. With respect to any of the embodiments described above, the controller 50 may optionally fade in the headlights 20, the deck lid light 26, and/or the puddle lamp 28 during the activation sequence.

At step 82, the controller 50 maintains the front and rear exterior lights at a predetermined intensity. As described herein, the front exterior lights generally include the DRL 22 of the headlamps 18a, 18b, and the rear exterior lights generally include the taillights 24a, 24b, the deck lid light 26, the puddle lamp 28, or a combination thereof. At step 84, the controller 50 implements a deactivation sequence upon expiration of a predetermined period of time (e.g., 25 seconds). In instances where the vehicle 10 is turned ON prior to the expiration of the predetermined time period, the deactivation sequence may commence upon vehicle start-up.

In one embodiment, the controller 50 implements the deactivation sequence by fading out the DRL 22 of the headlamps 18a, 18b and also fading out the taillights 24a, 24b. Alternatively, the controller 50 may sequentially deactivate the DRL 22 of the headlamps 18a, 18b while fading out the taillights 24a, 24b. Alternatively still, the controller 50 may sequentially deactivate the DRL 22 of the headlamps 18a, 18b and also sequentially deactivate the taillights 24a, 24b. According to one embodiment, the controller 50 sequentially deactivates the DRL 22 of the headlamps 18a, 18b and/or the taillights 24a, 24b from outboard to inboard. In instances where the headlights 20, the deck lid light 26, and/or puddle lamp 28 are activated, the controller 50 may also fade them out during the deactivation sequence. With respect to the embodiments described herein, it is conceived that the activation/deactivation sequence and/or predetermined period of time may be set by the OEM or set by a user via the smart device 74 or a human machine interface of the vehicle 10 such as a center console. In so doing, the user may customize the activation and deactivation sequence of the front and rear exterior lights based on his or her preferences.

With respect to the lighting method 76 described herein, it is assumed that the activation sequence is generally implemented during a welcome event, that is, a driver or other occupant is approaching the vehicle 10 and unlocks the doors. Thus, the activation sequence generally occurs while the vehicle 10 is turned OFF. However, it is to be understood that the activation sequence may be similarly activated during a farewell event, that is, when the vehicle 10 is turned OFF and the doors of the vehicle 10 are unlocked such that the driver or other occupant can exit the vehicle 10.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A lighting system of a vehicle, comprising:
   a headlamp;
   a taillight; and
   a controller configured to operate the headlamp and the taillight, wherein the controller implements an activation sequence based on a state of a door, and wherein the activation sequence comprises fading in the headlamp and the taillight and maintaining the headlamp and the taillight at a predetermined intensity.

2. The lighting system of claim 1, wherein the controller senses a state of the door based on input received from a door sensor.

3. The lighting system of claim 1, wherein the activation sequence further comprises fading in a deck lid light.

4. The lighting system of claim 1, wherein the controller implements the light sequence when the door is unlocked.

5. The lighting system of claim 1, wherein the activation sequence is implemented for a predetermined period of time.

6. The lighting system of claim 5, wherein upon expiration of the predetermined period of time, the controller implements a shut-off sequence that includes fading out the headlamp and the taillight.

7. The lighting system of claim 1, wherein the controller further implements the activation sequence based upon the detection of a wireless electronic device proximate the vehicle.

8. A lighting system of a vehicle, comprising:
a headlamp;
a taillight; and
a controller configured to operate the headlamp and the taillight, wherein the controller implements an activation sequence based on a state of a door, and wherein the activation sequence comprises sequentially activating at least one of the headlamp and the taillight from inboard to outboard.

9. The lighting system of claim 8, wherein the controller implements the light sequence when the door is unlocked.

10. The lighting system of claim 8, wherein the activation sequence further comprises maintaining the headlamp and the taillight at a predetermined intensity.

11. The lighting system of claim 8, wherein the activation sequence is implemented for a predetermined period of time, and wherein upon expiration of the predetermined period of time, the controller implements a shut-off sequence that includes sequentially deactivating at least one of the headlamp and the taillight from outboard to inboard.

12. The lighting system of claim 8, wherein the activation sequence further comprises fading in a deck lid light.

13. The lighting system of claim 8, wherein the headlamp comprises a daytime running light configured as a sequential light.

14. The lighting system of claim 8, wherein the controller comprises a first channel electrically coupled to a front left headlamp and a rear left taillight, and second channel electrically coupled to a front right headlamp and rear right taillight.

15. A lighting method of a vehicle, comprising the steps of:
sensing a state of a door;
based on the state of the door, sequentially activating at least one of a headlamp and a taillight;
maintaining the headlamp and the taillight at a predetermined intensity; and
sequentially deactivating at least one of the headlamp and the taillight from outboard to inboard upon expiration of a predetermined period of time.

16. The lighting method of claim 15, wherein the step of sensing comprises detection of the door in an unlocked state.

17. The lighting method of claim 15, further comprising fading in a puddle lamp based on the state of the door.

18. The lighting method of claim 15, wherein the step of sequentially activating is further based on a wireless electronic device being detected in proximity to the vehicle.

19. The lighting method of claim 15, wherein the predetermined period of time is adjustable.

20. The lighting method of claim 15, wherein the headlamp and the taillight are both configured as sequential lights.

\* \* \* \* \*